US010773298B2

(12) United States Patent
Hohenbichler

(10) Patent No.: US 10,773,298 B2
(45) Date of Patent: Sep. 15, 2020

(54) METHOD FOR CASTING METAL STRIP WITH CROWN CONTROL

(71) Applicant: PRIMETALS TECHNOLOGIES AUSTRIA GMBH, Linz (AT)

(72) Inventor: Gerald Hohenbichler, Kronstorf (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 668 days.

(21) Appl. No.: 15/528,579

(22) PCT Filed: Nov. 26, 2015

(86) PCT No.: PCT/EP2015/077774
§ 371 (c)(1),
(2) Date: May 22, 2017

(87) PCT Pub. No.: WO2016/083506
PCT Pub. Date: Jun. 2, 2016

(65) Prior Publication Data
US 2017/0341134 A1 Nov. 30, 2017

Related U.S. Application Data

(60) Provisional application No. 62/085,360, filed on Nov. 28, 2014.

(51) Int. Cl.
*B22D 11/06* (2006.01)
*B22D 11/16* (2006.01)
(Continued)

(52) U.S. Cl.
CPC ...... *B22D 11/0682* (2013.01); *B22D 11/0622* (2013.01); *B22D 11/0651* (2013.01);
(Continued)

(58) Field of Classification Search
CPC ............ B22D 11/0682; B22D 11/0622; B22D 11/0651; B22D 11/168; B22D 11/22
See application file for complete search history.

(56) References Cited

U.S. PATENT DOCUMENTS 5,560,421 A   10/1996   Tanaka et al.
5,787,967 A    8/1998   Vendeville
(Continued)

FOREIGN PATENT DOCUMENTS

CN   1147432 A   4/1997
CN   1248190 A   3/2000
(Continued)

OTHER PUBLICATIONS

Japanese Office Action dated Jul. 17, 2018, Application No. 2017-528542.
(Continued)

*Primary Examiner* — Kevin P Kerns
*Assistant Examiner* — Steven S Ha
(74) *Attorney, Agent, or Firm* — Ostrolenk Faber LLP

(57) ABSTRACT

A casting of metal strip by continuous casting in a twin roll caster is provied. In a twin roll caster, molten metal is introduced between a pair of counter-rotated horizontal casting rolls that are cooled so that metal shells solidify on the moving roll surfaces. The twin roll caster is capable of continuously producing cast strip from molten steel through a sequence of ladles positioned on a turret. In casting thin strip by twin roll caster, the crown of the casting surfaces of the casting rolls varies during a casting campaign. The crown of the casting surfaces of the casting rolls in turn determines the strip thickness profile.

50 Claims, 11 Drawing Sheets

(51) Int. Cl.
   *B22D 11/22*   (2006.01)
   *B21B 27/08*   (2006.01)
   *B21B 37/32*   (2006.01)
   *C03B 35/18*   (2006.01)
(52) U.S. Cl.
   CPC ............ *B22D 11/168* (2013.01); *B22D 11/22* (2013.01); *B21B 27/08* (2013.01); *B21B 37/32* (2013.01); *C03B 35/183* (2013.01)

(56) References Cited

U.S. PATENT DOCUMENTS

| | | |
|---|---|---|
| 6,408,222 B1 | 6/2002 | Kim |
| 7,455,635 B2 | 11/2008 | Marti |
| 2004/0035549 A1 | 2/2004 | Eberwein |
| 2004/0256077 A1 | 12/2004 | Marti |
| 2009/0314459 A1 | 12/2009 | Blejde |

FOREIGN PATENT DOCUMENTS

| | | |
|---|---|---|
| CN | 1254331 A | 5/2000 |
| CN | 1481287 A | 3/2004 |
| CN | 1555300 A | 12/2004 |
| CN | 102131600 A | 7/2011 |
| JP | H01180751 A | 7/1989 |
| JP | H02104449 A | 4/1990 |
| JP | H05245593 A | 9/1993 |
| JP | H0631405 A | 2/1994 |
| JP | H07256402 A | 10/1995 |
| WO | WO 2010015028 A1 | 2/2010 |

OTHER PUBLICATIONS

International Search Report and Written Opinion for PCT/EP2015/07774, filed Nov. 26, 2015; 12 pgs.

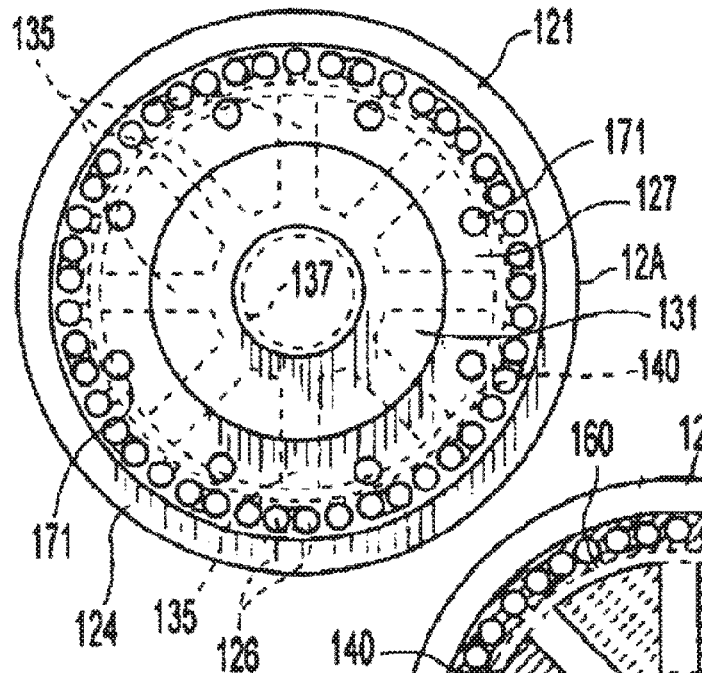
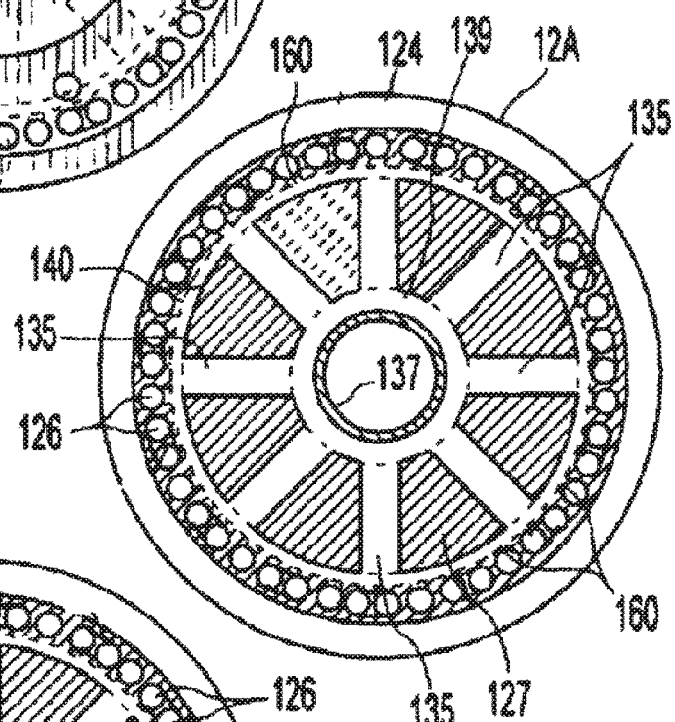
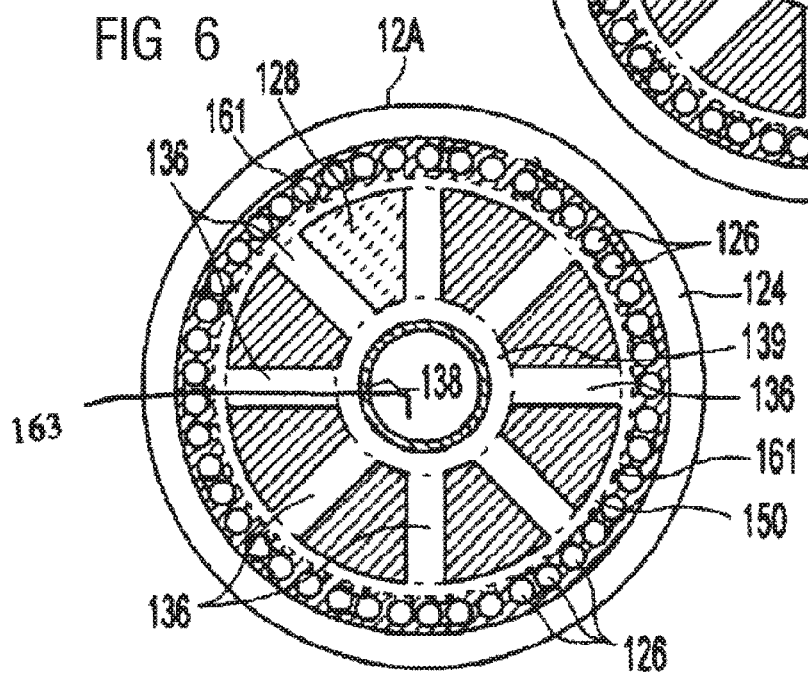

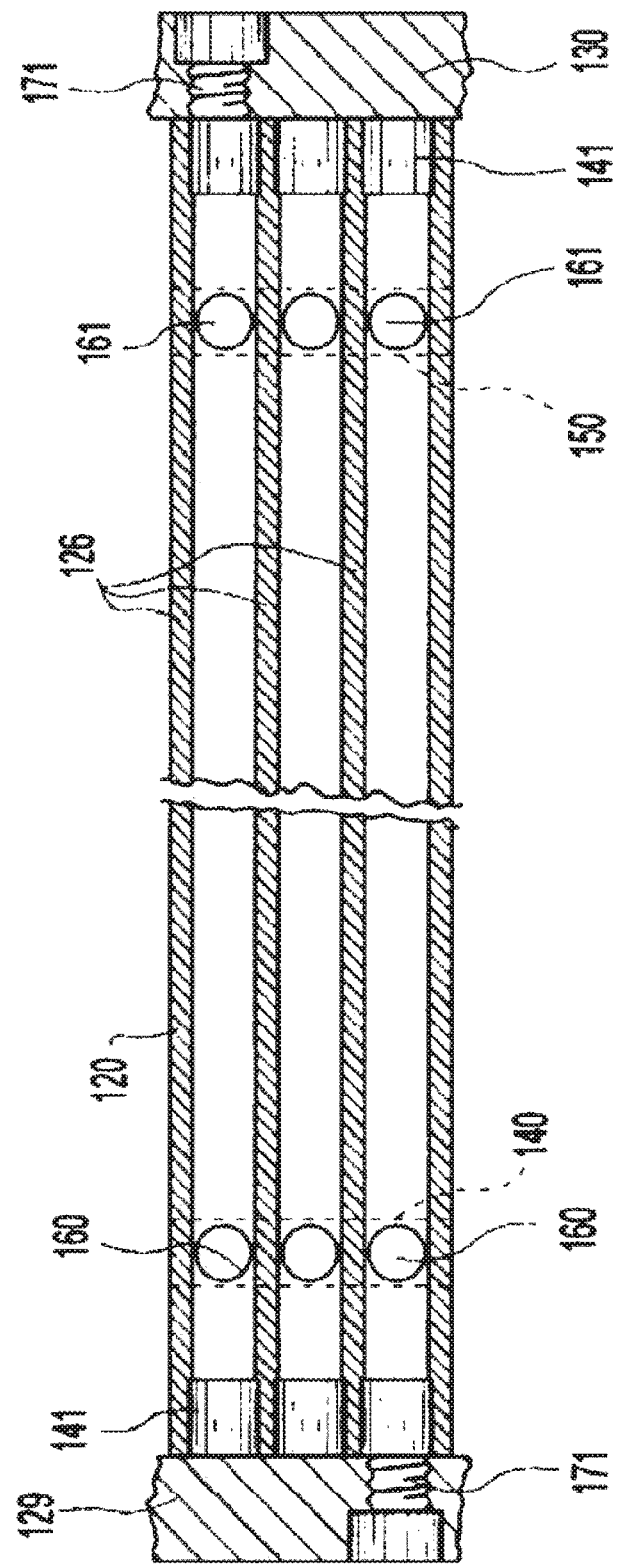

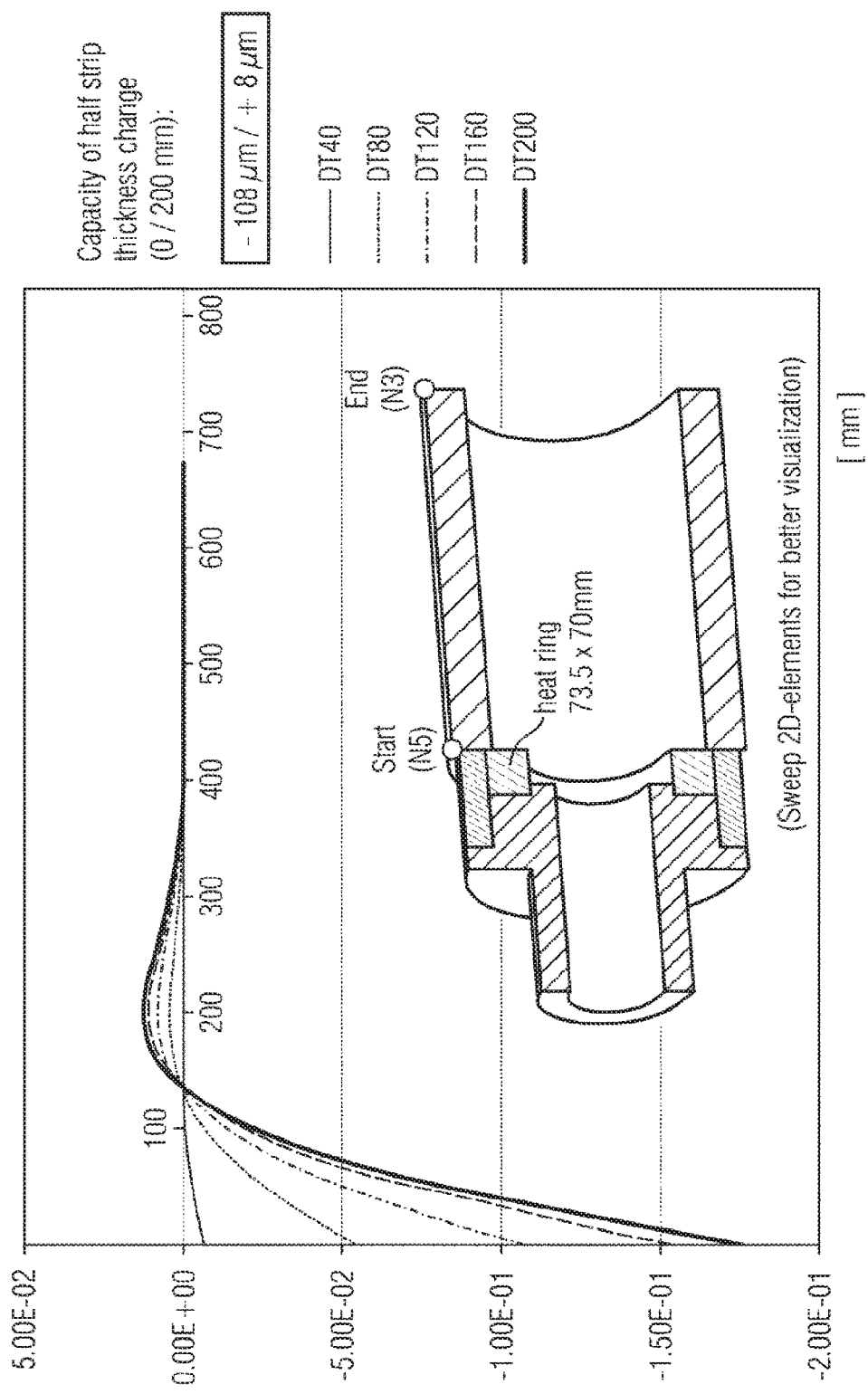

METHOD FOR CASTING METAL STRIP WITH CROWN CONTROL

CROSS-REFERENCE TO RELATED APPLICATIONS

This application claims priority to PCT Application No. PCT/EP2015/077774, having a filing date of Nov. 26, 2015, which is based upon and claims priority to U.S. Application No. 62/085,360, having a filing date of Nov. 28, 2014 the entire contents both of which are hereby incorporated by reference.

FIELD OF TECHNOLOGY

The following relates to the casting of metal strip by continuous casting in a twin roll caster.

BACKGROUND

In a twin roll caster, molten metal is introduced between a pair of counter-rotated horizontal casting rolls that are cooled so that metal shells solidify on the moving roll surfaces and are brought together at a nip between them to produce a solidified strip product delivered downwardly from the nip between the rolls. The term "nip" is used herein to refer to the general region at which the rolls are closest together. The molten metal may be poured from a ladle into a smaller vessel or series of smaller vessels from which it flows through a metal delivery nozzle located above the nip forming a casting pool of molten metal supported on the casting surfaces of the rolls immediately above the nip and extending along the length of the nip. This casting pool is usually confined between side plates or dams held in sliding engagement with end surfaces of the rolls so as to dam the two ends of the casting pool against outflow.

The twin roll caster is capable of continuously producing cast strip from molten steel through a sequence of ladles positioned on a turret. Pouring the molten metal from the ladle into a tundish and then a moveable tundish before flowing through the metal delivery nozzle enables the exchange of an empty ladle for a full ladle on the turret without disrupting the production of the cast strip.

In casting thin strip by twin roll caster, the crown of the casting surfaces of the casting rolls varies during a casting campaign. The crown of the casting surfaces of the casting rolls in turn determines the strip thickness profile, i.e., cross-sectional shape, of the thin cast strip produced by the twin roll caster. Casting rolls with convex (i.e. positive crown) casting surfaces produce cast strip with a negative (i.e. depressed) cross-sectional shape; and casting rolls with concave (i.e. negative crown) casting surfaces produce cast strip with a positive (i.e. raised) cross-sectional shape. The casting rolls generally are formed of copper or copper alloy, usually coated with chromium or nickel, with internal passages for circulation of cooling water enabling high heat fluxes for rapid solidification where the casting rolls undergo substantial thermal deformation with exposure to the molten metal during a casting campaign.

In thin strip casting, a roll crown is desired to produce a desired strip cross-sectional thickness profile under typical casting conditions. It is usual to machine the casting rolls when cold with an initial crown based on the projected crown in the casting surfaces of the casting rolls during casting. However, the differences between the shape of the casting surfaces of the casting rolls between cold and casting conditions are difficult to predict. Moreover, the crown of the casting surfaces of the casting rolls during the casting campaign can vary significantly. The crown of the casting surfaces of the casting rolls can change during casting due to changes in the temperature of the molten metal supplied to the casting pool of the caster, changes in casting speed of the casting rolls, and other casting conditions, such as slight changes in molten steel composition.

Previous proposals for casting roll crown control have relied on mechanical devices to physically deform the casting roll; for example, by the movement of deforming pistons or other elements within the casting roll or by applying bending forces to the support shafts of the casting rolls. However, these previous proposals for casting roll crown control have limitations. For example, Japanese Patent No. 2544459 (herein "JP '459") describes a casting roll with internal "water-cooled roll heating means embedded in the two end parts" used to control the deformation experienced at each roll end during casting. See, JP '459, Section: "Means employed in order to solve the problem". The casting rolls are solid metal rolls with internal cooling channels, which require water heating means at the end of the casting rolls. The limitations of the caster disclosed in JP '459 are discussed in U.S. Pat. No. 5,560,421 (herein "the '421 Patent"), which states that "the thermal capacitance of each drum 01 to be heated is large, a deformation responsibility of the shape of the outer surfaces of the drum to be controlled is low and it would be difficult or impossible to timely control the workpiece". Patent '421, col. 1, 11, 64-col. 2, 11, 1. The '421 Patent continues to explain, "it would be impossible to suitably control the shape of the workpiece to be continuously cast". Id., col. 2, 11, 6-7. The '421 Patent proposes a solution in which the solid casting rolls have end cutouts with large external (to the solid roll) annular elements heated by water. These annular elements are used to change the profile of the casting roll.

However, large solid casting rolls such as those proposed by JP '459 and the '421 Patent are expensive to manufacture, have shorter service life (due to the effects of thermal fatigue from the cyclic heat flux experienced during twin roll casting on larger cylinder masses), and are much less responsive due to their large thermal mass.

SUMMARY

An aspect relates to a reliable and effective way to directly and closely control the shape of the crown in the casting surfaces of the casting rolls during casting, and in turn, the cross-sectional thickness profile of the thin cast strip produced by the twin roll caster.

Disclosed is a reliable and effective method of controlling casting roll crown and, in turn, the cross-sectional strip thickness profile by controlling the crown in the casting surfaces by expansion rings positioned within and adjacent cylindrical tubes forming the casting rolls. Disclosed is a method of continuously casting thin strip by controlling roll crown comprising the steps of:

a. assembling a caster having a pair of counter rotating casting rolls with a nip there between capable of delivering cast strip downwardly from the nip, each casting roll having a casting surface formed by a cylindrical tube having thickness of no more than 80 millimeters of a material selected from the group consisting of copper and copper alloy, optionally with a coating thereon, and having a plurality of longitudinal water flow passages extending through the tube;

b. positioning two expansion rings within and adjacent the cylindrical tube, each expansion ring centerline being spaced within 450 mm (preferred within 200 mm) of edge portions of the cast strip formed on opposite end portions of the casting rolls during a casting campaign, the expansion rings adapted to increase in radial dimension causing the cylindrical tube to expand changing roll crown of the casting surfaces of the casting rolls and thickness profile of the cast strip during casting;

c. assembling a metal delivery system capable of forming a casting pool supported on the casting surfaces of the casting rolls above the nip with side dams adjacent to the ends of the nip to confine the casting pool;

d. positioning at least one sensor capable of sensing at least one of the following properties:

the thickness profile of the cast strip downstream;
the local thickness of the cast strip at a defined spot close to the cast strip edges;
the casting roll surface crown during the casting campaign;
the radial casting roll expansion at a defined spot close to the cast strip edges;

and generating digital or analogous (typically electrical) signals indicative of at least one of the above mentioned properties of the cast strip; and c. controlling the radial dimension of the expansion rings responsive to at least one of the digital or analogous signals received from the sensor to control the roll crown of the casting surfaces of the casting rolls during the casting campaign.

Moreover, the method of continuously casting thin strip by controlling roll crown may further comprise the step of controlling casting roll drive to vary the speed of rotation of the casting rolls while varying the radial dimension of the expansion rings responsive to at least one of the digital or analogous signals received from the at least one sensor to control roll crown of the casting surfaces of the casting rolls during the casting campaign.

Additionally, the method of continuously casting thin strip by controlling roll crown may further comprise the step of positioning one expansion ring or multiple expansion rings (e.g. up to 15 expansion rings) corresponding to the center portions of the cast strip formed on the casting rolls during casting, the expansion ring adapted to increase in radial dimension causing the cylindrical tube to expand changing crown of the casting surfaces and the thickness profile of the cast strip during casting. Furthermore, the method of continuously casting thin strip by controlling roll crown may include the step of controlling casting roll drive to vary the speed of rotation of the casting rolls while varying the radial dimension of the expansion rings spaced from the edge portions of the cast strip and the radial dimension of the expansion ring corresponding to center portions of the cast strip responsive to electrical signals received from the sensor to control the roll crown of the casting surfaces of the casting rolls during the casting campaign.

Alternatively, the method of continuously casting thin strip by controlling roll crown may comprise the steps of:

a. assembling a caster having a pair of counter rotating casting rolls with a nip there between capable of delivering cast strip downwardly from the nip, each casting roll having a casting surface formed by a substantially cylindrical tube having thickness of no more than 80 millimeters of a material selected from the group consisting of copper and copper alloy, optionally with a coating thereon, and having a plurality of longitudinal water flow passages extending through the tube;

b. positioning at least one expansion ring within and adjacent the cylindrical tube at a position corresponding to center portions of the cast strip formed on the casting rolls during campaign, the expansion ring adapted to increase in radial dimension causing the cylindrical tube to expand changing crown of the casting surfaces and thickness profile of the cast strip during casting;

c. assembling a metal delivery system capable of forming a casting pool supported on the casting surfaces of the casting rolls above the nip with side dams adjacent ends of the nip to confine the casting pool;

d. positioning at least one sensor capable of sensing at least one of the following properties:

thickness profile of the cast strip downstream;
the local thickness of the cast strip at a defined spot close to the cast strip center,
the casting roll surface crown during the casting campaign,
the radial casting roll expansion at a defined spot close to the cast strip center;
and generating digital or analogous (typically electrical) signals indicative of the at least one above mentioned properties of the cast strip; and e. controlling the radial dimension of the expansion ring responsive to at least one of the digital or analogous signals received from the sensor to control the roll crown of the casting surfaces of the casting rolls during a casting campaign.

Moreover, the method of continuously casting thin strip by controlling roll crown may further comprise the step of controlling casting roll drive to vary the speed of rotation of the casting rolls while varying the radial dimension of the expansion ring responsive to electrical signals received from the sensor to control roll crown of the casting surfaces of the casting rolls during the casting campaign.

Additionally, the method of continuously casting thin strip by controlling roll crown may further comprise the step of positioning two expansion rings within and adjacent the cylindrical tube, each expansion ring spaced within 450 mm of edge portions of the cast strip formed on opposite end portions of the casting rolls during a casting campaign, the expansion rings adapted to increase in radial dimension causing the cylindrical tube to expand changing roll crown of the casting surfaces of the casting rolls and thickness profile of the cast strip during casting. Furthermore, the method of continuously casting thin strip by controlling roll crown may include the step of controlling casting roll drive to vary the speed of rotation of the casting rolls while varying the radial dimension of the expansion ring corresponding to center portions of the cast strip and the radial dimension of the expansion rings spaced from the edge portions of the cast strip responsive to electrical signals received from the sensor to control the roll crown of the casting surfaces of the casting rolls during the casting campaign. In each embodiment, the expansion rings may be made of an austenitic stainless steel such as 18/8 austenitic stainless steel. Each expansion ring may have an annular dimension between 50 to 150 millimeters; preferably, 70 millimeters. Each expansion ring may have a width of up to 200 millimeters; preferably up to 100 mm, more preferably 83.5 millimeters.

In each embodiment of the method, the crown in the casting surfaces of the casting rolls can readily be varied to achieve a desired thickness profile of the cast strip. Each expansion ring is adapted to increase in radial dimension causing the cylindrical tube to expand changing crown of the casting surfaces of the casting rolls and the thickness profile of the cast strip. The thickness of the cylindrical tube may range between 40 and 80 millimeters in thickness or between 60 and 80 millimeters in thickness.

In each embodiment of the method, a sensor adapted to sense the thickness profile of the cast strip and capable of generating electrical signals indicative of the thickness profile of the cast strip is positioned downstream. The sensor may be located adjacent to pinch rolls through which the strip passes after casting. Each expansion ring may provide a heating input of up to 30 kW; preferably, of 6 kW.

Crown control of the casting surfaces of the casting rolls is achieved by controlling the radial dimension of each expansion ring responsive to the electrical signals received from said profile sensor. Furthermore, crown control of the casting surfaces of the casting rolls may be achieved by controlling the casting roll drive to vary the speed of rotation of the casting rolls while also varying the radial dimension of each expansion ring responsive to the electrical signals received from the sensor.

The radial dimension of each expansion ring may be independently controlled from the radial dimension of the other expansion ring or rings. The radial dimension of the expansion rings adjacent the strip edges formed on the casting surfaces of the casting rolls may be independently controlled from each other. Additionally, the radial dimension of the expansion rings adjacent the strip edges formed on the casting surfaces of the casting rolls may be independently controlled from the expansion ring corresponding to the center portions of the cast strip.

Also disclosed is an apparatus for continuously casting thin strip for controlling roll crown comprising:

a. a pair of counter rotating casting rolls with a nip there between capable of delivering cast strip downwardly from the nip, each casting roll having a casting surface formed by a cylindrical tube having thickness of no more than 80 millimeters of a material selected from the group consisting of copper and copper alloy, optionally with a coating thereon, and having a plurality of longitudinal water flow passages extending through the tube;

b. two expansion rings within and adjacent the cylindrical tube each positioned within 450 mm of edge portions of the cast strip formed on opposite end portions of the casting rolls during a casting campaign, each expansion ring adapted to increase in radial dimension causing the cylindrical tube to expand changing roll crown of the casting surfaces of the casting rolls and thickness profile of the cast strip during casting;

c. a metal delivery system positioned above the nip and capable of forming a casting pool supported on the casting surfaces of the casting rolls with side dams adjacent ends of the nip to confine the casting pool; and d. a sensor capable of sensing the thickness profile of the cast strip positioned downstream of the nip and generating electrical signals indicative of the thickness profile of the cast strip to control radial dimension of the expansion rings responsive to the electrical signals received from the sensor to control the roll crown of the casting surfaces of the casting rolls during the casting campaign.

Furthermore, the apparatus for continuously casting thin strip by controlling roll crown may comprise a control system capable of controlling casting roll drive and varying the speed of rotation of the casting rolls while varying the radial dimension of the expansion rings responsive to electrical signals received from the sensor to control the roll crown of the casting surfaces of the casting rolls during the casting campaign.

Additionally, the apparatus for continuously casting thin strip for controlling roll crown may further comprise at least one expansion ring within and adjacent the cylindrical tube at a position corresponding to center portions of cast strip formed on the casting rolls during casting, the expansion ring adapted to increase in radial dimension causing the cylindrical tube to expand changing crown of the casting surfaces of the casting rolls and thickness profile of the cast strip during casting. Moreover, the apparatus for continuously casting thin strip for controlling roll crown may further comprise a control system capable of controlling casting roll drive and varying the speed of rotation of the casting rolls while varying the radial dimension of the expansion rings spaced from the edge portions of the cast strip and the radial dimension of the expansion ring corresponding to center portions of the cast strip responsive to electrical signals received from the sensor to control the roll crown of the casting surfaces of the casting rolls during the casting campaign.

Alternatively, the apparatus for continuously casting thin strip for controlling roll crown may comprise:

a. a pair of counter rotating casting rolls with a nip there between capable of delivering cast strip downwardly from the nip, each casting roll having a casting surface formed by a cylindrical tube having thickness of no more than 80 millimeters of a material selected from the group consisting of copper and copper alloy optionally with a coating thereon and having a plurality of longitudinal water flow passages extending through the tube;

b. at least one expansion ring within and adjacent the cylindrical tube at a position corresponding to center portions of the cast strip formed on the casting rolls during a casting campaign, the expansion ring adapted to increase in radial dimension causing the cylindrical tube to expand changing crown of the casting surfaces and thickness profile of the cast strip during casting;

c. a metal delivery system positioned above the nip and capable of forming a casting pool supported on the casting surfaces of the casting rolls with side dams adjacent ends of the nip to confine the casting pool; and d. a sensor capable of sensing the thickness profile of the cast strip positioned downstream of the nip and generating electrical signals indicative of the thickness profile of the cast strip to control radial dimension of the expansion rings responsive to the electrical signals received from the sensor to control the roll crown of the casting surfaces of the casting rolls during the casting campaign.

Furthermore, the apparatus for continuously casting thin strip by controlling roll crown may comprise a control system capable of controlling casting roll drive and varying the speed of rotation of the casting rolls while varying the radial dimension of the expansion ring responsive to electrical signals received from the sensor to control the roll crown of the casting surfaces of the casting rolls during the casting campaign.

Additionally, the apparatus for continuously casting thin strip for controlling roll crown may further comprise two expansion rings within and adjacent the cylindrical tube, each expansion ring spaced within 450 mm of edge portions of the cast strip formed on opposite end portions of the casting rolls during a casting campaign, the expansion rings adapted to increase in radial dimension causing the cylindrical tube to expand changing roll crown of the casting surfaces of the casting rolls and thickness profile of the cast strip during the casting campaign. Moreover, the apparatus for continuously casting thin strip for controlling roll crown may further comprise a control system capable of controlling casting roll drive and varying the speed of rotation of the casting rolls while varying the radial dimension of the expansion ring corresponding to center portions of the cast strip and the radial dimension of the expansion rings spaced from the edge portions of the cast strip responsive to electrical signals received from the sensor to control the roll crown of the casting surfaces of the casting rolls during the casting campaign.

In each embodiment of the apparatus, the expansion rings may be made of an austenitic stainless steel such as 18/8 austenitic stainless steel. Each expansion ring may have an annular dimension between 50 to 150 millimeters; preferably, 70 millimeters. Each expansion ring may have a width of up to 200 millimeters; preferably, 83.5 millimeters.

In each embodiment of the apparatus, each expansion ring is adapted to increase in radial dimension causing the cylindrical tube to expand changing crown of the casting surfaces of the casting rolls and the thickness profile of the cast strip during casting.

Again, in each embodiment of the apparatus, a sensor capable of sensing the thickness profile of the cast strip and capable of generating electrical signals indicative of the thickness profile of the cast strip may be positioned downstream. The sensor may be located adjacent to pinch rolls through which the strip passes after casting. Each expansion ring may provide a heating input of up to 30 kW; preferably, of 6 kW.

Crown control of the casting surfaces of the casting rolls may be achieved by controlling the radial dimension of each expansion ring responsive to the electrical signals received from said sensor. Furthermore, crown control of the casting surfaces of the casting rolls may be achieved by controlling the casting roll drive to vary the speed of rotation of the casting rolls while also varying the radial dimension of each expansion ring responsive to the electrical signals received from the sensor.

The radial dimension of each expansion ring may be independently controlled form the radial dimension of the other expansion ring or rings. The radial dimension of the expansion rings adjacent the strip edges formed on the casting surfaces of the casting rolls may be independently controlled from each other. Additionally, the radial dimension of the expansion rings adjacent the strip edges formed on the casting surfaces of the casting rolls may be independently controlled from the expansion ring corresponding to the center portions of the cast strip.

Various aspects of embodiment of the invention will become apparent to those skilled in the art from the following detailed description, drawings and claims.

BRIEF DESCRIPTION

Some of the embodiments will be described in detail, with reference to the following figures, wherein like designations denote like members, wherein:

FIG. 4 is an end view of the casting roll of FIG. 3A on line 4-4 shown in partial interior detail in phantom;

FIG. 5 is a cross sectional view of the casting roll of FIG. 3A on line 5-5;

FIG. 6 is a cross sectional view of the casting roll of FIG. 3A on line 6-6;

FIG. 7 is a cross sectional view of the casting roll of FIG. 3A on line 7-7;

FIG. 11 is a graph of profile correction of half strip thickness vs. length along the cylindrical tube (mm).

DETAILED DESCRIPTION

Figure 1:
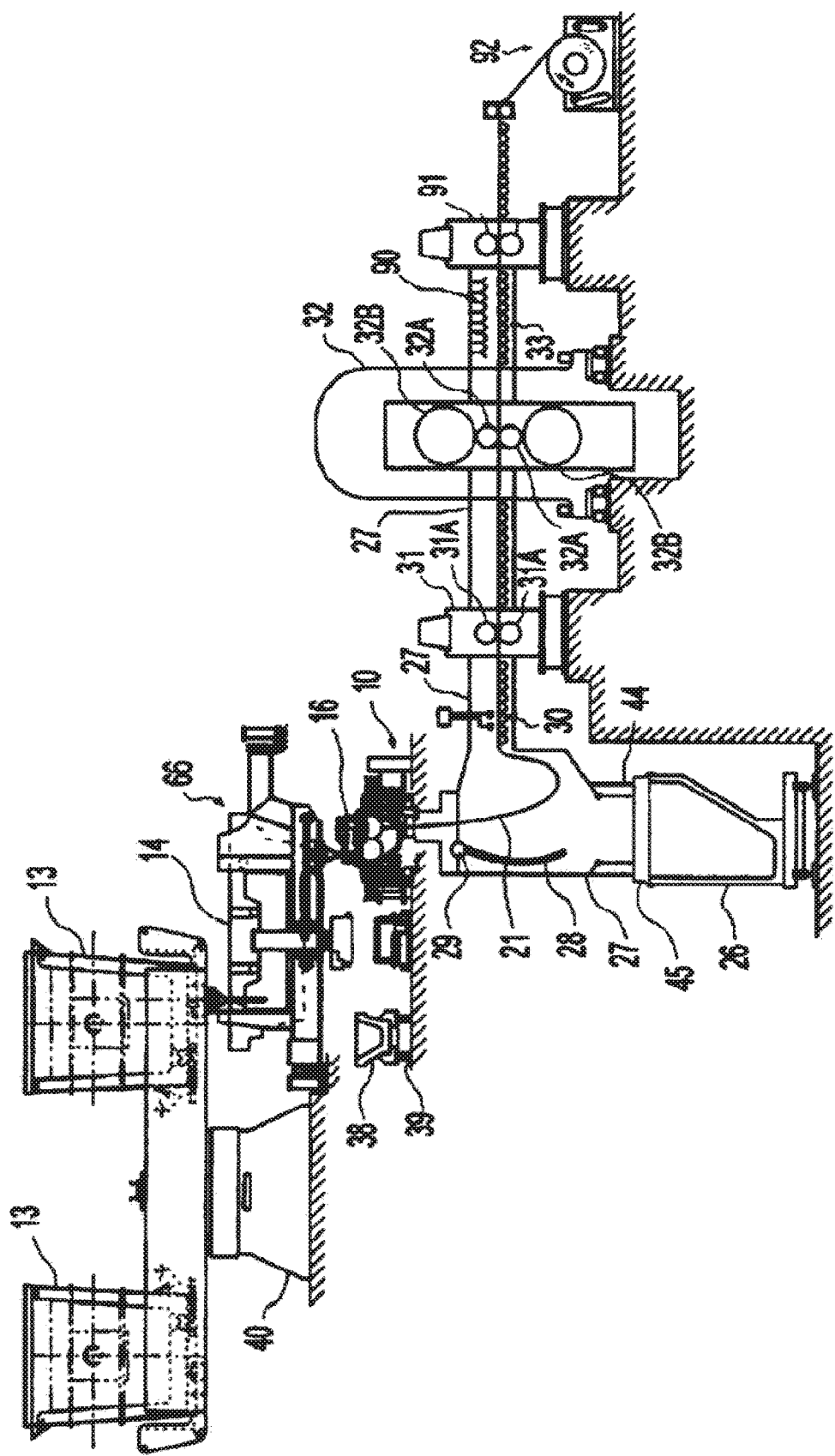
FIG. 1 is a diagrammatical side view of a twin roll caster of the present disclosure.
Figure 2:
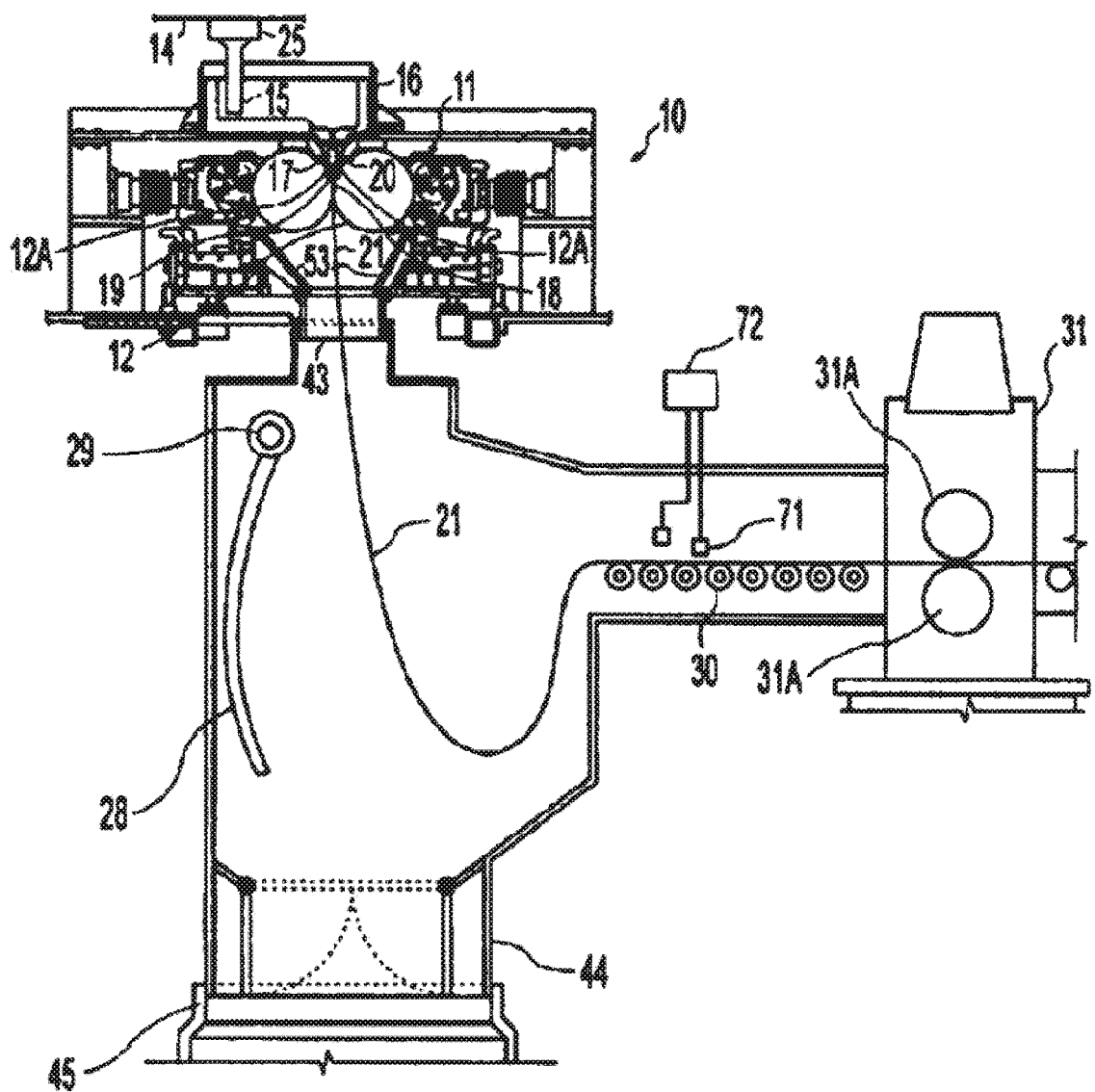
FIG. 2 is an enlarged partial sectional view of a portion of the twin roll caster of FIG. 1 including a strip inspection device for measuring strip profile.
Figure 2A:
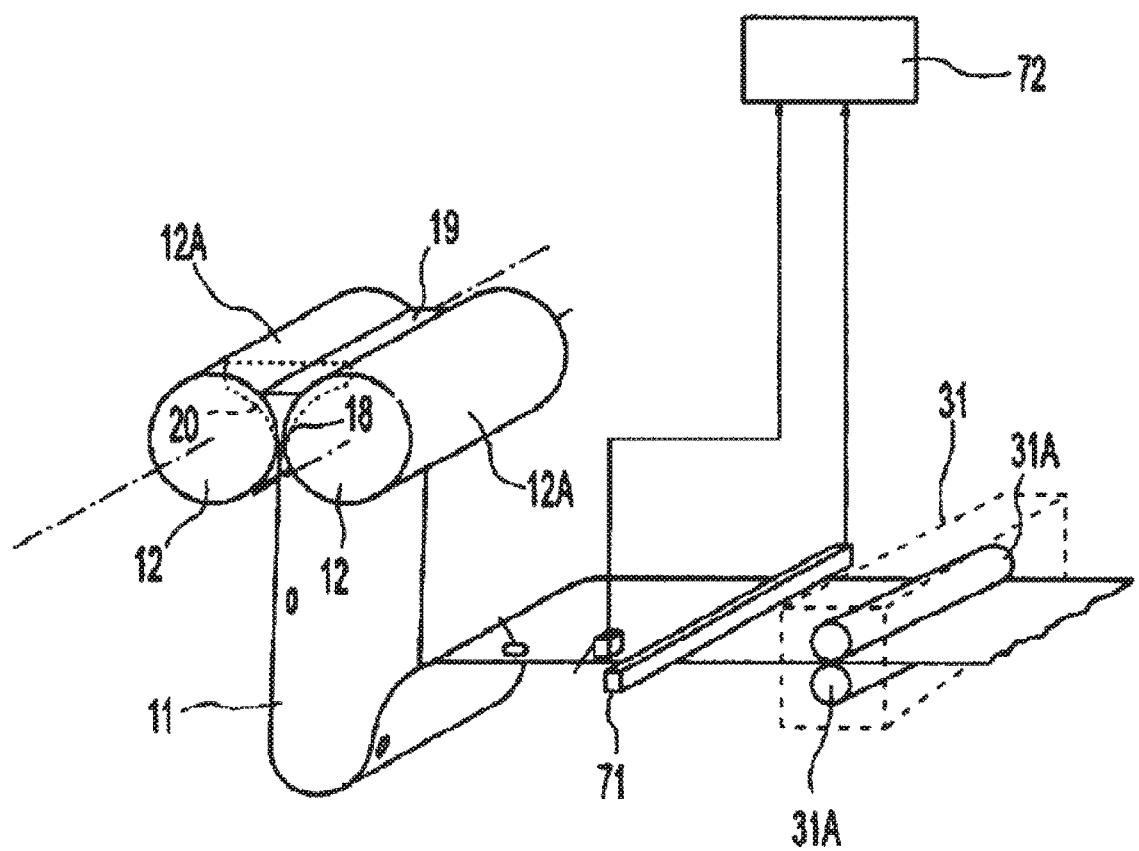
FIG. 2A is a schematic view of a portion of twin roll caster of FIG. 2.

Referring now to FIGS. 1, 2, and 2A, a twin roll caster is illustrated that comprises a main machine frame 10 that stands up from the factory floor and supports a pair of counter-rotatable casting rolls 12 mounted in a module in a roll cassette 11. The casting rolls 12 are mounted in the roll cassette 11 for ease of operation and movement as described below. The roll cassette 11 facilitates rapid movement of the casting rolls 12 ready for casting from a setup position into an operative casting position in the caster as a unit, and ready removal of the casting rolls 12 from the casting position when the casting rolls 12 are to be replaced. There is no particular configuration of the roll cassette 11 that is desired, so long as it performs that function of facilitating movement and positioning of the casting rolls 12 as described herein.

The casting apparatus for continuously casting thin steel strip includes the pair of counter-rotatable casting rolls 12 having casting surfaces 12A laterally positioned to form a nip 18 there between. Molten metal is supplied from a ladle 13 through a metal delivery system to a metal delivery nozzle 17, core nozzle, positioned between the casting rolls 12 above the nip 18. Molten metal thus delivered forms a casting pool 19 of molten metal above the nip 18 supported on the casting surfaces 12A of the casting rolls 12. This casting pool 19 is confined in the casting area at the ends of the casting rolls 12 by a pair of side closure plates, or side dams 20, (shown in dotted line in FIGS. 2 and 2A). The upper surface of the casting pool 19 (generally referred to as the "meniscus" level) may rise above the lower end of the delivery nozzle 17 so that the lower end of the delivery nozzle 17 is immersed within the casting pool 19. The casting area includes the addition of a protective atmosphere above the casting pool 19 to inhibit oxidation of the molten metal in the casting area.

The ladle 13 typically is of a conventional construction supported on a rotating turret 40. For metal delivery, the ladle 13 is positioned over a movable tundish 14 in the casting position to fill the tundish 14 with molten metal. The movable tundish 14 may be positioned on a tundish car 66 capable of transferring the tundish 14 from a heating station (not shown), where the tundish 14 is heated to near a casting temperature, to the casting position. A tundish guide, such as rails 39, may be positioned beneath the tundish car 66 to enable moving the movable tundish 14 from the heating station to the casting position.

The movable tundish 14 may be fitted with a slide gate 25, actuable by a servo mechanism, to allow molten metal to flow from the tundish 14 through the slide gate 25, and then through a refractory outlet shroud 15 to a transition piece or distributor 16 in the casting position. From the distributor 16, the molten metal flows to the delivery nozzle 17 positioned between the casting rolls 12 above the nip 18.

The side dams 20 may be made from a refractory material such as zirconia graphite, graphite alumina, boron nitride, boron nitride-zirconia, or other suitable composites. The side dams 20 have a face surface capable of physical contact with the casting rolls 12 and molten metal in the casting pool 19. The side dams 20 are mounted in side dam holders (not shown), which are movable by side dam actuators (not shown), such as a hydraulic or pneumatic cylinder, servo mechanism, or other actuator to bring the side dams 20 into engagement with the ends of the casting rolls 12. Additionally, the side dam actuators are capable of positioning the side dams 20 during casting. The side dams 20 form end closures for the molten pool of metal on the casting rolls 12 during the casting operation.

FIG. 1 shows the twin roll caster producing the cast strip 21, which passes across a guide table 30 to a pinch roll stand 31, comprising pinch rolls 31A. Upon exiting the pinch roll stand 31, the thin cast strip 21 may pass through a hot rolling mill 32, comprising a pair of work rolls 32A, and backup rolls 32B, forming a gap capable of hot rolling the cast strip 21 delivered from the casting rolls 12, where the cast strip 21 is hot rolled to reduce the strip to a desired thickness, improve the strip surface, and improve the strip flatness. The work rolls 32A have work surfaces relating to the desired strip profile across the work rolls 32A. The hot rolled cast strip 21 then passes onto a run-out table 33, where it may be cooled by contact with a coolant, such as water, supplied via water jets 90 or other suitable means, and by convection and radiation. In any event, the hot rolled cast strip 21 may then pass through a second pinch roll stand 91 to provide tension of the cast strip 21, and then to a coiler 92. The cast strip 21 may be between about 0.3 and 2.0 millimeters in thickness before hot rolling.

At the start of the casting operation, a short length of imperfect strip is typically produced as casting conditions stabilize. After continuous casting is established, the casting rolls 12 are moved apart slightly and then brought together again to cause this leading end of the cast strip 21 to break away forming a clean head end of the following cast strip 21. The imperfect material drops into a scrap receptacle 26, which is movable on a scrap receptacle guide. The scrap receptacle 26 is located in a scrap receiving position beneath the caster and forms part of a sealed enclosure 27 as described below. The enclosure 27 is typically water cooled. At this time, a water-cooled apron 28 that normally hangs downwardly from a pivot 29 to one side in the enclosure 27 is swung into position to guide the clean end of the cast strip 21 onto the guide table 30 that feeds it to the pinch roll stand 31. The apron 28 is then retracted back to its hanging position to allow the cast strip 21 to hang in a loop beneath the casting rolls 12 in enclosure 27 before it passes to the guide table 30 where it engages a succession of guide rollers.

An overflow container 38 may be provided beneath the movable tundish 14 to receive molten material that may spill from the tundish 14. As shown in FIG. 1, the overflow container 38 may be movable on rails 39 or another guide such that the overflow container 38 may be placed beneath the movable tundish 14 as desired in casting locations. Additionally, an optional overflow container (not shown) may be provided for the distributor 16 adjacent the distributor 16.

The sealed enclosure 27 is formed by a number of separate wall sections that fit together at various seal connections to form a continuous enclosure wall that permits control of the atmosphere within the enclosure 27. Additionally, the scrap receptacle 26 may be capable of attaching with the enclosure 27 so that the enclosure 27 is capable of supporting a protective atmosphere immediately beneath the casting rolls 12 in the casting position. The enclosure 27 includes an opening in the lower portion of the enclosure 27, lower enclosure portion 44, providing an outlet for scrap to pass from the enclosure 27 into the scrap receptacle 26 in the scrap receiving position. The lower enclosure portion 44 may extend downwardly as a part of the enclosure 27, the opening being positioned above the scrap receptacle 26 in the scrap receiving position. As used in the specification and claims herein, "seal," "sealed," "sealing," and "sealingly" in reference to the scrap receptacle 26, enclosure 27, and related features may not be a complete seal so as to prevent leakage, but rather is usually less than a perfect seal as appropriate to allow control and support of the atmosphere within the enclosure 27 as desired with some tolerable leakage.

A rim portion 45 may surround the opening of the lower enclosure portion 44 and may be movably positioned above the scrap receptacle 26, capable of sealingly engaging and/or attaching to the scrap receptacle 26 in the scrap receiving position. The rim portion 45 may be movable between a sealing position in which the rim portion 45 engages the scrap receptacle 26, and a clearance position in which the rim portion 45 is disengaged from the scrap receptacle 26. Alternately, the caster or the scrap receptacle 26 may include a lifting mechanism to raise the scrap receptacle 26 into sealing engagement with the rim portion 45 of the enclosure 27, and then lower the scrap receptacle 26 into the clearance position. When sealed, the enclosure 27 and scrap receptacle 26 are filled with a desired gas, such as nitrogen, to reduce the amount of oxygen in the enclosure 27 and provide a protective atmosphere for the cast strip 21.

The enclosure 27 may include an upper collar portion 43 supporting a protective atmosphere immediately beneath the casting rolls 12 in the casting position. When the casting rolls 12 are in the casting position, the upper collar portion 43 is moved to the extended position closing the space between a housing portion 53 adjacent the casting rolls 12, as shown in FIG. 2, and the enclosure 27. The upper collar portion 43 may be provided within or adjacent the enclosure 27 and adjacent the casting rolls 12, and may be moved by a plurality of actuators (not shown) such as servo-mechanisms, hydraulic mechanisms, pneumatic mechanisms, and rotating actuators.

The casting rolls 12 are internally water cooled as described below so that as the casting rolls 12 are counter-rotated, shells solidify on the casting surfaces 12A, as the casting surfaces 12A move into contact with and through the casting pool 19 with each revolution of the casting rolls 12. The shells are brought close together at the nip 18 between the casting rolls 12 to produce a thin cast strip product 21 delivered downwardly from the nip 18. The thin cast strip product 21 is formed from the shells at the nip 18 between the casting rolls 12 and delivered downwardly and moved downstream as described above.

Referring now to FIGS. 3A-9, each casting roll 12 includes a cylindrical tube 120 of a metal selected from the group consisting of copper and copper alloy, optionally with a coating thereon, e.g., chromium or nickel, to form the casting surfaces 12A. Each cylindrical tube 120 may be mounted between a pair of stub shaft assemblies 121 and 122. The stub shaft assemblies 121 and 122 have end portions 127 and 128, respectively (shown in FIGS. 4-6), which fit snugly within the ends of cylindrical tube 120 to form the casting roll 12. The tube cylindrical 120 is thus supported by end portions 127 and 128 having flange portions 129 and 130, respectively, to form internal cavity 163 therein, and support the assembled casting roll between the stub shaft assemblies 121 and 122.

The outer cylindrical surface of each cylindrical tube 120 is a roll casting surface 12A. The radial thickness of the cylindrical tube 120 may be no more than 80 millimeters thick. The thickness of the tube 120 may range between 40 and 80 millimeters in thickness or between 60 and 80 millimeters in thickness.

Each cylindrical tube 120 is provided with a series of longitudinal water flow passages 126, which may be formed by drilling long holes through the circumferential thickness of the cylindrical tube 120 from one end to the other. The ends of the holes are subsequently closed by end plugs 141 attached to the end portions 127 and 128 of stub shaft assemblies 121 and 122 by fasteners 171. The water flow passages 126 are formed through the thickness of the cylindrical tube 120 with end plugs 141. The number of stub shaft fasteners 171 and end plugs 141 may be selected as desired. End plugs 141 may be arranged to provide, with water passage in the stub shaft assemblies described below, in single pass cooling from one end to the other of the roll 12, or alternatively, to provide multi-pass cooling where, for example, the flow passages 126 are connected to provide three passes of cooling water through adjacent flow passages 126 before returning the water to the water supply directly or through the cavity 163.

The water flow passages 126 through the thickness of the cylindrical tube 120 may be connected to water supply in series with the cavity 163. The water passages 126 may be connected to the water supply so that the cooling water first passes through the cavity 163 and then the water supply passages 126 to the return lines, or first through the water supply passages 126 and then through the cavity 163 to the return lines.

The cylindrical tube 120 may be provided with circumferential steps 123 at end to form shoulders 124 with the working portion of the roll casting surface 12A of the roll 12 there between. The shoulders 124 are arranged to engage the side dams 20 and confine the casting pool 19 as described above during the casting operation.

End portions 127 and 128 of stub shaft assemblies 121 and 122, respectively, typically sealingly engage the ends of cylindrical tube 120 and have radially extending water passages 135 and 136 shown in FIGS. 4-6 to deliver water to the water flow passages 126 extending through the cylindrical tube 120. The radial flow passages 135 and 136 are connected to the ends of at least some of the water flow passages 126, for example, in threaded arrangement, depending on whether the cooling is a single pass or multi-pass cooling system. The remaining ends of the water flow passages 126 may be closed by, for example, threaded end plugs 141 as described where the water cooling is a multi-pass system.

As shown in detail by FIG. 7, cylindrical tube 120 may be positioned in annular arrays in the thickness of cylindrical tube 120 either in single pass or multi-pass arrays of water flow passages 126 as desired. The water flow passages 126 are connected at one end of the casting roll 12 by radial ports 160 to the annular gallery 140 and in turn radially flow passages 135 of end portion 127 in stub shaft assembly 120, and are connected at the other end of the casting roll 12 by radial ports 161 to annular gallery 150 and in turn radial flow passages 136 of end portions 128 in stub shaft assembly 121. Water supplied through one annular gallery, 140 or 150, at one end of the roll 12 can flow in parallel through all of the water flow passages 126 in a single pass to the other end of the roll 12 and out through the radial passages, 135 or 136, and the other annular gallery, 150 or 140, at that other end of the cylindrical tube 120. The directional flow may be reversed by appropriate connections of the supply and return line(s) as desired. Alternatively or additionally, selective ones of the water flow passages 126 may be optionally connected or blocked from the radial passages 135 and 136 to provide a multi pass arrangement, such as a three pass.

The stub shaft assembly 122 may be longer than the stub shaft assembly 121, and the stub shaft assembly 122 provided with two sets of water flow ports 133 and 134. Water flow ports 133 and 134 are capable of connection with rotary water flow couplings 131 and 132 by which water is delivered to and from the casting roll 12 axially through stub shaft assembly 122. In operation, cooling water passes to and from the water flow passages 126 in the cylindrical tube 120 through radial passages 135 and 136 extending through end portions 127 and 128 of the stub shaft assemblies 121 and 122, respectively. The stub shaft assembly 121 is fitted with axial tube 137, to provide fluid communication between the radial passages 135 in end portions 127 and the central cavity within the casting roll 12. The stub shaft assembly 122 is fitted with axial space tube 138, to separate a central water duct 138, in fluid communication with the central cavity 163, and from annular water flow duct 139 in fluid communication with radial passages 136 in end portion 122 of stub shaft assembly 122. Central water duct 138 and annular water duct 139 are capable of providing inflow and outflow of cooling water to and from the casting roll 12.

In operation, incoming cooling water may be supplied through supply line 131 to annular duct 139 through ports 133, which is in turn in fluid communication with the radial passages 136, gallery 150 and water flow passages 126, and then returned through the gallery 140, the radial passages 135, axial tube 137, central cavity 163, and central water duct 138 to outflow line 132 through water flow ports 134. Alternatively, the water flow to, from and through the casting roll 12 may be in the reverse direction as desired. The water flow ports 133 and 134 may be connected to water supply and return lines so that water may flow to and from water flow passages 126 in the cylindrical tube 120 of the casting roll 12 in either direction, as desired. Depending on the direction of flow, the cooling water flows through the cavity 163 either before or after flow through the water flow passages 126.

Figure 8:
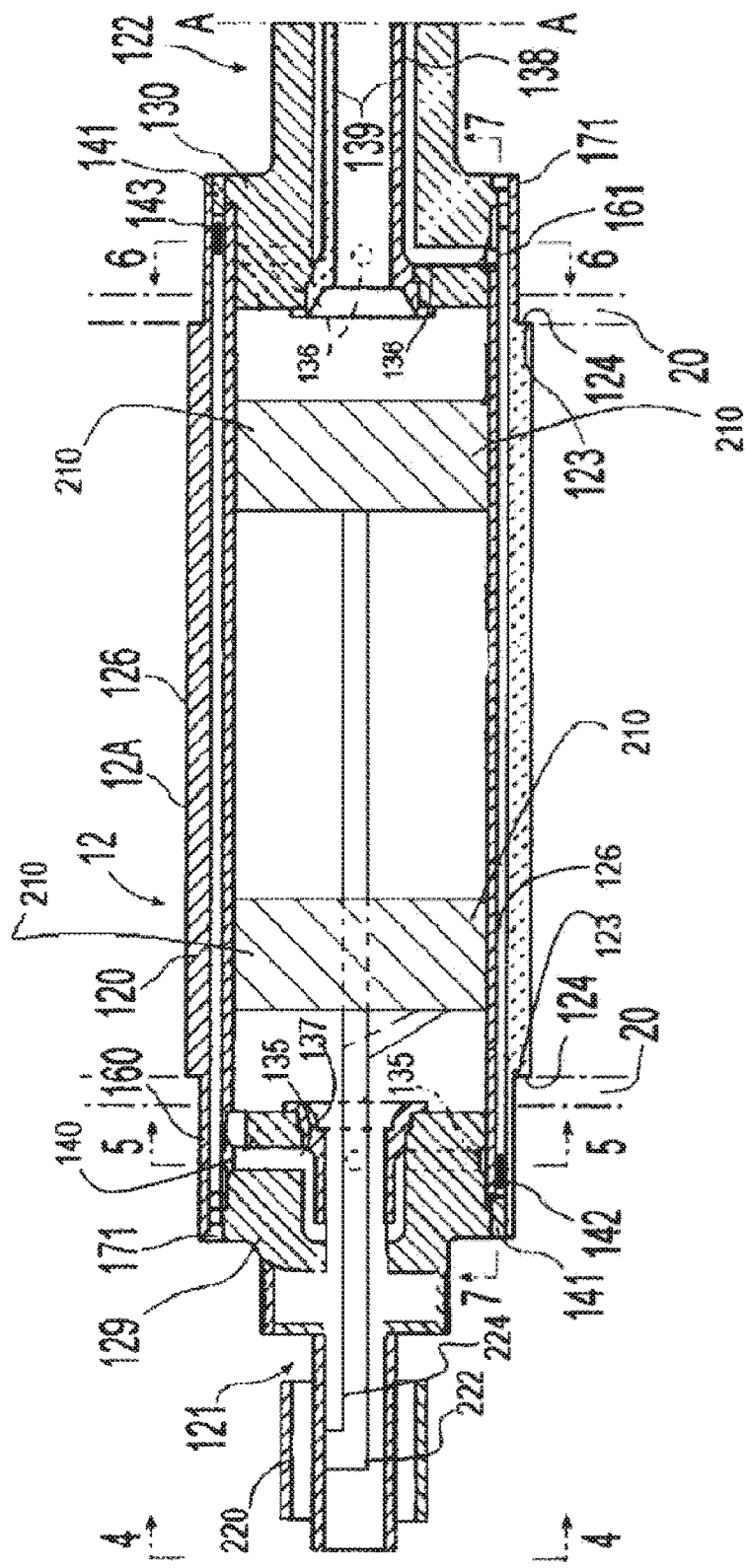
FIG. 8 is a cross sectional view longitudinally through a portion of one of the casting rolls of FIG. 2 with two expansion rings spaced from the edge portions of the cast strip.
Figure 9:
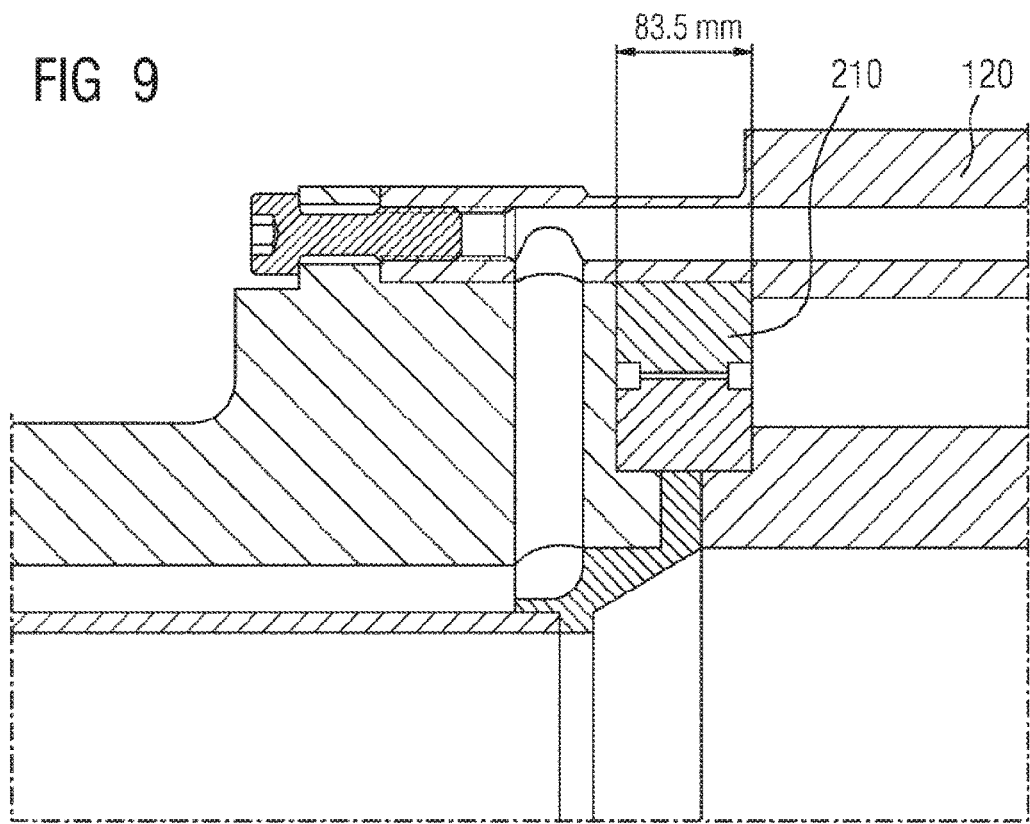
FIG. 9 is a cross sectional view longitudinally through a portion of a casting roll with an expansion ring spaced from the edge portions of the cast strip.

Each cylindrical tube 120 is provided with at least one expansion ring. As illustrated in FIG. 8, each cylindrical tube 120 may be provided with at least two expansion rings 210 spaced on opposite end portions of the cylindrical tube 120 inward within 450 mm of edge portions of the cast strip formed on opposite end portions of the casting rolls during the casting campaign. FIG. 9 shows a cross sectional view longitudinally through a portion of a casting roll with an expansion ring 210 spaced from the edge portions of the cast strip.

Figure 10:
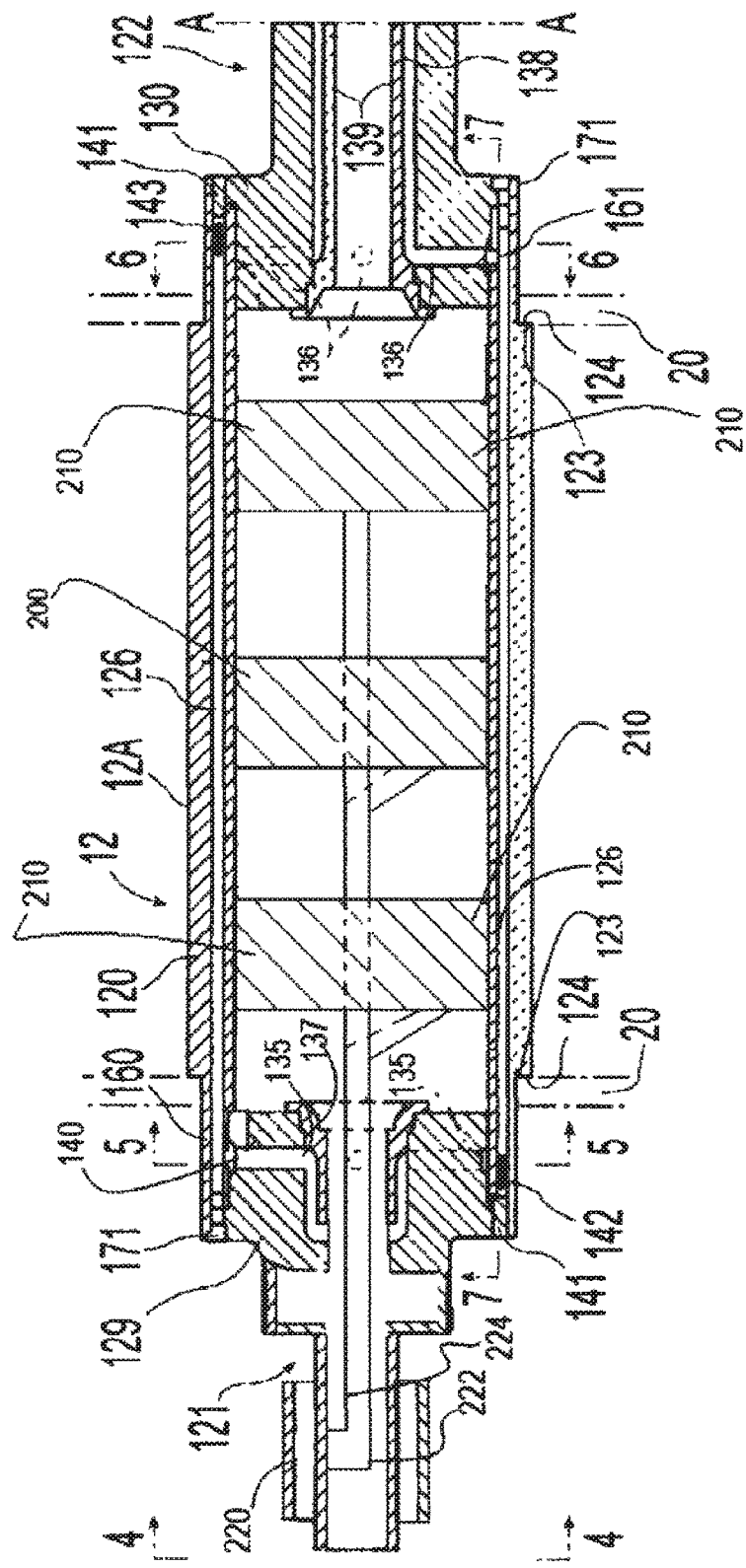
FIG. 10 is a cross sectional view longitudinally through a portion of one of the casting rolls of FIG. 2 with two expansion rings spaced from the edge portions of the cast strip and an expansion ring corresponding to center portions of the cast strip.

Alternatively, as illustrated in FIG. 10, two expansion rings 210 may be spaced on opposite end portions of the cylindrical tube within 450 mm of edge portions of the cast strip formed on opposite end portions of the casting rolls during the casting campaign and an additional expansion ring 200 may be positioned within and adjacent the cylindrical tube 120 at a position corresponding to center portions of the cast strip formed on the casting surfaces of the casting rolls during casting.

Figure 3A:
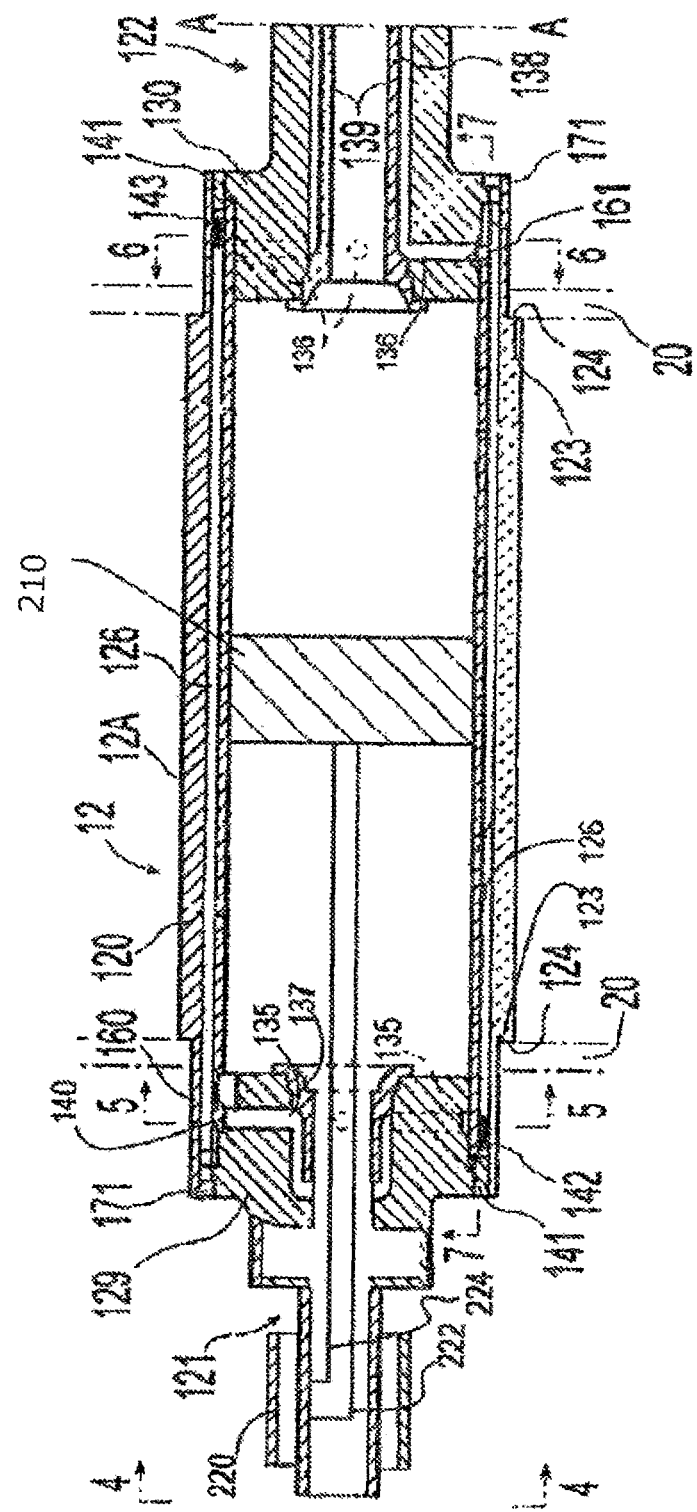
FIG. 3A is a cross sectional view longitudinally through a portion of one of the casting rolls of FIG. 2 with an expansion ring corresponding to center portions of the cast strip.
Figure 3B:
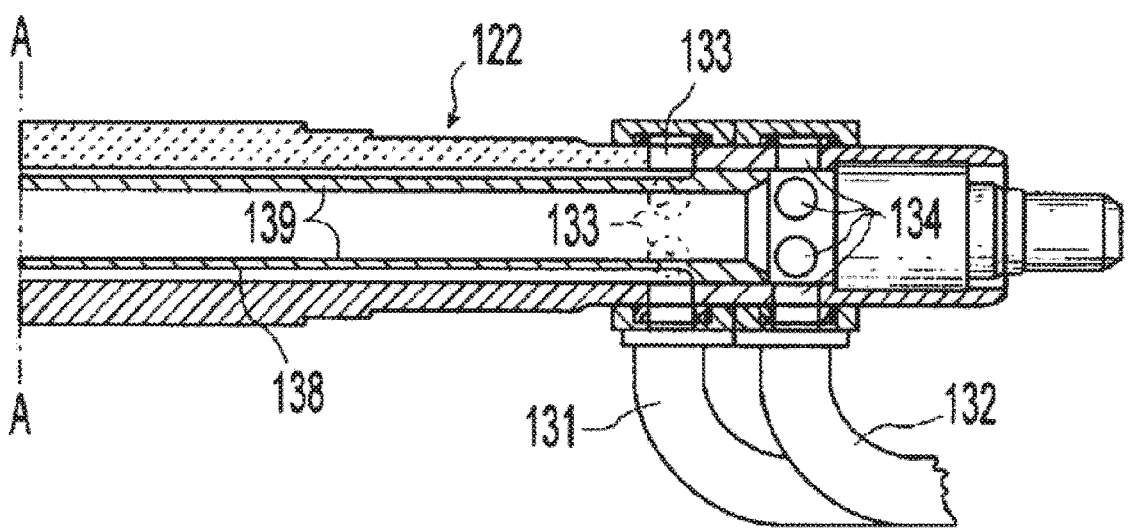
FIG. 3B is a cross sectional view longitudinally through the remaining portion of the casting roll of FIG. 3A joined on line A-A.

In another embodiment, as illustrated back in FIG. 3A, an expansion ring 210 may be positioned within and adjacent the cylindrical tube 120 at a position corresponding to center portions of the cast strip formed on the casting surfaces of the casting rolls during casting.

Each expansion ring spaced from the edge portions of the cast strip may have an annular dimension between 50 and 150 mm; preferably, 70 mm. Similarly, the expansion ring corresponding to center portions of the cast strip formed on the casting surfaces of the casting rolls during casting may have an annular dimension between 50 and 150 mm; preferably, 70 mm.

Each expansion ring spaced from the edge portions of the cast strip may have a width of up to 200 mm; preferably, 83.5 mm. Similarly, the expansion ring corresponding to center portions of the cast strip formed on the casting surfaces of the casting rolls during casting may have a width of up to 200 mm; preferably, 83.5 mm.

Deformation of the crown of the casting surfaces may be controlled by regulating the radial dimension of the at least one expansion ring located inside the cylindrical tube. The radial dimension of the at least one expansion ring may be controlled by regulating the temperature of the expansion ring. In turn, the thickness profile of cast strip may be controlled with the control of the crown of the casting surfaces of the casting rolls. Since the circumferential thickness of the cylindrical tube is made to a thickness of no more than 80 mm, the crown of the casting surfaces may be deformed responsive to changes in the radial dimension of the expansion ring.

Each expansion ring is adapted to increase in radial dimension causing the cylindrical tube to expand changing the crown of the casting surfaces and the thickness profile of the cast strip during casting. Power wire 222 and control wire 224 extend from slip ring 220 to each expansion ring. Power wire 222 supplies the energy to electrically power the expansion ring. Control wire 224 modulates the energy to electrically power the expansion ring.

Each expansion ring is electrically heated increasing in radial dimension. Each expansion ring may provide a heating input of up to 30 kW; preferably, of 6 kW. The force generated from the increase in radial dimension will be applied on the cylindrical tube causing the cylindrical tube to expand changing the crown of the casting surfaces and the thickness profile of the cast strip. FIG. 12 shows the effect of expansion ring temperature on the cast strip thickness profile. FIG. 11 is a graph of the profile correction of half strip thickness versus the length along the cylindrical tube (mm) for expansion temperatures from 40° C. to 200° C. To achieve a desired thickness profile via control of the radial dimension of the expansion rings and control of the casting speed, a strip thickness profile sensor 71 may be positioned downstream to detect the thickness profile of the cast strip 21 as shown in FIGS. 2 and 2A. The strip thickness sensor 71 is provided typically between the nip 18 and the pinch rolls 31A to provide for direct control of the casting roll 12. The sensor may be an x-ray gauge or other suitable device capable of directly measuring the thickness profile across the width of the strip periodically or continuously. Alternatively, a plurality of non-contact type sensors are arranged across the cast strip 21 at the roller table 30 and the combination of thickness measurements from the plurality of positions across the cast strip 21 are processed by a controller 72 to determine the thickness profile of the strip periodically or continuously. The thickness profile of the cast strip 21 may be determined from this data periodically or continuously as desired.

The radial dimension of each expansion ring may be independently controlled form the radial dimension of the other expansion ring or rings. The radial dimension of the expansion rings adjacent the strip edges formed on the casting surfaces of the casting rolls may be independently controlled from each other. Additionally, the radial dimension of the expansion rings adjacent the strip edges formed on the casting surfaces of the casting rolls may be independently controlled from the expansion ring corresponding to the center portions of the cast strip. The sensor 71 generates signals indicative of the thickness profile of the cast strip. The radial dimension of each expansion ring is controlled according to the signals generated by the sensor, which in turns control roll crown of the casting surfaces of the casting rolls during the casting campaign.

Furthermore, the casting roll drive may be controlled to vary the speed of rotation of the casting rolls while also varying the radial dimension of the expansion ring responsive to the electrical signals received from the sensor 71 controlling in turn the roll crown of the casting surfaces of the casting rolls during the casting campaign.

Although the invention has been described and illustrated in detail by way of the preferred exemplary embodiment, the invention is not restricted by the disclosed examples and other variations can be derived herefrom by a person skilled in the art without departing from the scope of protection of the invention.

For the sake of clarity, it is to be understood that the use of 'a' or 'an' throughout this application does not exclude a plurality, and 'comprising' does not exclude other steps or elements.

What is claimed is:

1. A method of continuously casting thin strip by controlling roll crown comprising the steps of:
   a. assembling a caster having a pair of counter rotating casting rolls with a nip there between capable of delivering cast strip downwardly from the nip, each casting roll having a casting surface formed by a substantially cylindrical tube having thickness of no more than 80 millimeters of a material selected from the group consisting of copper and copper alloy, and having a plurality of longitudinal water flow passages extending through the tube;
   b. positioning two expansion rings within and adjacent the cylindrical tube, each expansion ring centerline being spaced within 450 mm of edge portions of the cast strip formed on opposite end portions of the casting rolls during a casting campaign, the expansion rings adapted to increase in radial dimension causing the cylindrical tube to expand changing roll crown of the casting surfaces of the casting rolls and thickness profile of the cast strip during casting;
   c. assembling a metal delivery system capable of forming a casting pool supported on the casting surfaces of the casting rolls above the nip with side dams adjacent to the ends of the nip to confine the casting pool;
   d. positioning at least one sensor capable of sensing at least one of the following properties:

the thickness profile of the cast strip downstream;
the local thickness of the cast strip at a defined spot closer to the cast strip edges than a center of the cast strip;
the casting roll surface crown during the casting campaign;
the radial casting roll expansion at a defined spot close to the cast strip edges;
and generating digital or analogous signals indicative of at least one of the above mentioned properties of the cast strip; and
e. controlling the radial dimension of the expansion rings responsive to at least one of the digital or analogous signals received from the at least one sensor to control the roll crown of the casting surfaces of the casting rolls during the casting campaign.

2. The method of continuously casting thin strip by controlling roll crown as claimed in claim 1 further comprising the step of:
positioning one expansion ring or multiple expansion rings corresponding to the center of the cast strip formed on the casting rolls during casting, the expansion ring adapted to increase in radial dimension causing the cylindrical tube to expand changing crown of the casting surfaces and thickness profile of the cast strip during casting.

3. The method of continuously casting thin strip by controlling roll crown as claimed in claim 2 further comprising the step of:
f. controlling casting roll drive to vary the speed of rotation of the casting rolls while varying the radial dimension of the expansion rings spaced from the edge portions of the cast strip and the radial dimension of the expansion rings corresponding to the center of the cast strip responsive to at least one of the digital or analogous signals received from the at least one sensor to control the roll crown of the casting surfaces of the casting rolls during the casting campaign.

4. The method of continuously casting thin strip by controlling roll crown as claimed in claim 2 where each expansion ring spaced from the edge portions of the cast strip has an annular dimension between 50 and 150 mm and the expansion rings corresponding to the center of the cast strip has an annular dimension between 50 and 150 mm.

5. The method of continuously casting thin strip by controlling roll crown as claimed in claim 2 where each expansion ring spaced from the edge portions of the cast strip has a width of up to 200 mm and the expansion ring corresponding to the center of the cast strip has a width of up to 200 mm.

6. The method of continuously casting thin strip by controlling roll crown as claimed in claim 2 where each expansion ring spaced from the edge portions of the cast strip provides a heating input of up to 30 kW and the expansion rings corresponding to the center of the cast strip provides a heating input of up to 30 kW.

7. The method of continuously casting thin strip by controlling roll crown as claimed in claim 2 where the radial dimension of each of the expansion rings spaced from the edge portions of the cast strip can be independently controlled to control the roll crown of the casting surfaces of the casting rolls from the radial dimension of the expansion ring corresponding to the center of the cast strip.

8. The method of continuously casting thin strip by controlling roll crown as claimed in claim 1 further comprising the step of:
f. controlling casting roll drive to vary the speed of rotation of the casting rolls while varying the radial dimension of the expansion rings responsive to at least one of the digital or analogous signals received from the at least one sensor to control roll crown of the casting surfaces of the casting rolls during the casting campaign.

9. The method of continuously casting thin strip by controlling roll crown as claimed in claim 1 where each expansion ring spaced from the edge portions of the cast strip has an annular dimension between 50 and 150 mm.

10. The method of continuously casting thin strip by controlling roll crown as claimed in claim 1 where each expansion ring spaced from the edge portions of the cast strip has a width of up to 200 mm.

11. The method of continuously casting thin strip by controlling roll crown as claimed in claim 1 where each expansion ring spaced from the edge portions of the cast strip provides a heating input of up to 30 kW.

12. The method of continuously casting thin strip by controlling roll crown as claimed in claim 1 where the radial dimension of each expansion ring spaced from the edge portions of the cast strip can be independently controlled to control the roll crown of the casting surfaces of the casting rolls.

13. The method of continuously casting thin strip by controlling roll crown as claimed in claim 1 further comprising the step of:
f. controlling the position of the casting roll to vary the horizontal distance between the casting roll axial centerlines while varying the radial dimension of the expansion rings corresponding to at least one property in a center portion or edge portion of the cast strip responsive to at least one of the digital or analogous signals received from the at least one sensor to control roll crown of the casting surfaces of the casting rolls during the casting campaign.

14. A method of continuously casting thin strip by controlling roll crown comprising the steps of:
a. assembling a caster having a pair of counter rotating casting rolls with a nip there between capable of delivering cast strip downwardly from the nip, each casting roll having a casting surface formed by a substantially cylindrical tube having thickness of no more than 80 millimeters of a material selected from the group consisting of copper and copper alloy and having a plurality of longitudinal water flow passages extending through the tube;
b. positioning at least one expansion ring within and adjacent the cylindrical tube at a position corresponding to a center of the cast strip formed on the casting rolls during a casting campaign, the expansion ring adapted to increase in radial dimension causing the cylindrical tube to expand changing crown of the casting surfaces and thickness profile of the cast strip during casting;
c. assembling a metal delivery system capable of forming a casting pool supported on the casting surfaces of the casting rolls above the nip with side dams adjacent ends of the nip to confine the casting pool;
d. positioning at least one sensor capable of sensing at least one of the following properties:
the thickness profile of the cast strip downstream;
the local thickness of the cast strip at a defined spot closer to the center of the cast strip than cast strip edges;
the casting roll surface crown during the casting campaign;
the radial casting roll expansion at a defined spot close to the center of the cast strip;

and generating digital or analogous signals indicative of the at least one above mentioned properties of the cast strip; and e. controlling the radial dimension of the expansion ring responsive to at least one of the digital or analogous signals received from the at least one sensor to control the roll crown of the casting surfaces of the casting rolls during the casting campaign.

15. The method of continuously casting thin strip by controlling roll crown as claimed in claim 14 further comprising the step of:

positioning two expansion rings within and adjacent the cylindrical tube, each expansion ring spaced within 450 mm of edge portions of the cast strip formed on opposite end portions of the casting rolls during a casting campaign, the expansion rings adapted to increase in radial dimension causing the cylindrical tube to expand changing roll crown of the casting surfaces of the casting rolls and thickness profile of the cast strip during the casting campaign.

16. The method of continuously casting thin strip by controlling roll crown as claimed in claim 15 further comprising the step of:

f. controlling casting roll drive to vary the speed of rotation of the casting rolls while varying the radial dimension of the expansion ring corresponding to the center of the cast strip and the radial dimension of the expansion rings spaced from the edge portions of the cast strip responsive to at least one of digital or analogous signals received from the at least one sensor to control the roll crown of the casting surfaces of the casting rolls during the casting campaign.

17. The method of continuously casting thin strip by controlling roll crown as claimed in claim 15 where the expansion ring corresponding to the center of the cast strip has an annular dimension between 50 and 150 mm and each expansion ring spaced from the edge portions of the cast strip has an annular dimension between 50 and 150 mm.

18. The method of continuously casting thin strip by controlling roll crown as claimed in claim 15 where the expansion ring corresponding to the center of the cast strip has a width of up to 200 mm and each expansion ring spaced from the edge portions of the cast strip has a width of up to 200 mm.

19. The method of continuously casting thin strip by controlling roll crown as claimed in claim 15 where the expansion ring corresponding to the center of the cast strip provides a heating input of up to 30 kW and each expansion ring spaced from the edge portions of the cast strip provides a heating input of up to 30 kW.

20. The method of continuously casting thin strip by controlling roll crown as claimed in claim 15 where the radial dimension of each expansion ring spaced from the edge portions of the cast strip can be independently controlled to control the roll crown of the casting surfaces of the casting rolls.

21. The method of continuously casting thin strip by controlling roll crown as claimed in claim 15 where the radial dimension of the expansion ring corresponding to the center of the cast strip can be independently controlled to control the roll crown of the casting surfaces of the casting rolls from the radial dimension of each of the expansion rings spaced from the edge portions of the cast strip.

22. The method of continuously casting thin strip by controlling roll crown as claimed in claim 14 further comprising the step of:

f. controlling casting roll drive to vary the speed of rotation of the casting rolls while varying the radial dimension of the expansion ring corresponding to the center of the cast strip responsive to at least one of the digital or analogous signals received from the at least one sensor to control roll crown of the casting surfaces of the casting rolls during the casting campaign.

23. The method of continuously casting thin strip by controlling roll crown as claimed in claim 14 further comprising the step of:

f. controlling the position of the casting roll to vary the horizontal distance between the casting roll axial centerlines while varying the radial dimension of the expansion rings corresponding to at least one property in a center portion or edge portion of the cast strip responsive to at least one of the digital or analogous signals received from the at least one sensor to control roll crown of the casting surfaces of the casting rolls during the casting campaign.

24. The method of continuously casting thin strip by controlling roll crown as claimed in claim 14 where the expansion ring corresponding to the center of the cast strip has an annular dimension between 50 and 150 mm.

25. The method of continuously casting thin strip by controlling roll crown as claimed in claim 14 where the expansion ring corresponding to the center of the cast strip has a width of up to 200 mm.

26. The method of continuously casting thin strip by controlling roll crown as claimed in claim 14 where the expansion ring corresponding to the center of the cast strip provides a heating input of up to 30 kW.

27. An apparatus for continuously casting thin strip by controlling roll crown comprising:

a. a pair of counter rotating casting rolls with a nip there between capable of delivering cast strip downwardly from the nip, each casting roll having a casting surface formed by a substantially cylindrical tube having thickness of no more than 80 millimeters of a material selected from the group consisting of copper and copper alloy and having a plurality of longitudinal water flow passages extending through the tube;

b. two expansion rings within and adjacent the cylindrical tube, each expansion ring spaced within 450 mm of edge portions of the cast strip formed on opposite end portions of the casting rolls during a casting campaign, the expansion rings adapted to increase in radial dimension causing the cylindrical tube to expand changing roll crown of the casting surfaces of the casting rolls and thickness profile of the cast strip during casting;

c. a metal delivery system positioned above the nip and capable of forming a casting pool supported on the casting surfaces of the casting rolls with side dams adjacent ends of the nip to confine the casting pool; and d. at least one sensor capable of sensing at least one of the following properties:

the thickness profile of the cast strip positioned downstream of the nip;

the local thickness of the cast strip at a defined spot closer to the cast strip edges than a center of the cast strip;

the casting roll surface crown during the casting campaign;

the radial casting roll expansion at a defined spot close to the cast strip edges;

and generating signals indicative of at least one of the above properties to control radial dimension of the expansion rings responsive to the signals received from the at least one sensor to control the roll crown of the casting surfaces of the casting rolls during the casting campaign.

28. The apparatus for continuously casting thin strip by controlling roll crown as claimed in claim 27 further comprising:
an expansion ring corresponding to the center of the cast strip formed on the casting rolls during the casting campaign, the expansion ring adapted to increase in radial dimension causing the cylindrical tube to expand changing crown of the casting surfaces and thickness profile of the cast strip during casting.

29. The apparatus for continuously casting thin strip by controlling roll crown as claimed in claim 28 further comprising:
e. a control system capable of controlling casting roll drive and varying the speed of rotation of the casting rolls while varying the radial dimension of the expansion rings spaced from the edge portions of the cast strip and the radial dimension of the expansion ring corresponding to the center of the cast strip responsive to electrical signals received from the at least one sensor to control the roll crown of the casting surfaces of the casting rolls during the casting campaign.

30. The apparatus for continuously casting thin strip by controlling roll crown as claimed in claim 28 where each expansion ring spaced from the edge portions of the cast strip has a width of up to 200 mm and the expansion ring corresponding to the center portions of the cast strip has a width of up to 200 mm.

31. The apparatus for continuously casting thin strip by controlling roll crown as claimed in claim 28 where each expansion ring spaced from the edge portions of the cast strip provides a heating input of up to 30 kW and the expansion ring corresponding to the center portions of the cast strip provides a heating input of up to 30 kW.

32. The apparatus for continuously casting thin strip by controlling roll crown as claimed in claim 28 where the radial dimension of the expansion rings spaced from the edge portions of the cast strip can be independently controlled to control the roll crown of the casting surfaces of the casting rolls from the radial dimension of the expansion ring corresponding to the center of the cast strip.

33. The apparatus for continuously casting thin strip by controlling roll crown as claimed in claim 27 further comprising:
e. a control system capable of controlling casting roll drive and varying the speed of rotation of the casting rolls while varying the radial dimension of the expansion rings responsive to electrical signals received from the at least one sensor to control the roll crown of the casting surfaces of the casting rolls during the casting campaign.

34. The apparatus for continuously casting thin strip by controlling roll crown as claimed in claim 27 where each expansion ring spaced from the edge portions of the cast strip has an annular dimension between 50 and 150 mm.

35. The apparatus for continuously casting thin strip by controlling roll crown as claimed in claim 27 where each expansion ring spaced from the edge portions of the cast strip has an annular dimension between 50 and 150 mm and the expansion ring corresponding to the center of the cast strip has an annular dimension between 50 and 150 mm.

36. The apparatus for continuously casting thin strip by controlling roll crown as claimed in claim 27 where each expansion ring spaced from the edge portions of the cast strip has a width of up to 200 mm.

37. The apparatus for continuously casting thin strip by controlling roll crown as claimed in claim 27 where each expansion ring spaced from the edge portions of the cast strip provides a heating input of up to 30 kW.

38. The apparatus for continuously casting thin strip by controlling roll crown as claimed in claim 27 where the radial dimension of each expansion ring spaced from the edge portions of the cast strip can be independently controlled to control the roll crown of the casting surfaces of the casting rolls.

39. An apparatus for continuously casting thin strip by controlling roll crown comprising:
a. a pair of counter rotating casting rolls with a nip there between capable of delivering cast strip downwardly from the nip, each casting roll having a casting surface formed by a cylindrical tube having thickness of no more than 80 millimeters of a material selected from the group consisting of copper and copper alloy, with a coating thereon, and having a plurality of longitudinal water flow passages extending through the tube;
b. at least one expansion ring within and adjacent the cylindrical tube at a position corresponding to a center of the cast strip formed on the casting rolls during a casting campaign, the expansion ring adapted to increase in radial dimension causing the cylindrical tube to expand changing crown of the casting surfaces and thickness profile of the cast strip during casting;
c. a metal delivery system positioned above the nip and capable of forming a casting pool supported on the casting surfaces of the casting rolls with side dams adjacent ends of the nip to confine the casting pool; and
d. at least one sensor capable of sensing at least one of the following properties:
the thickness profile of the cast strip positioned downstream of the nip;
the local thickness of the cast strip at a defined spot closer to the cast strip center than cast strip edges;
the casting roll surface crown during the casting campaign;
the radial casting roll expansion at a defined spot close to the cast strip center;
and generating signals indicative of at least one of the above properties to control radial dimension of the expansion rings responsive to the signals received from the at least one sensor to control the roll crown of the casting surfaces of the casting rolls during the casting campaign.

40. The apparatus for continuously casting thin strip by controlling roll crown as claimed in claim 39 further comprising:
two expansion rings within and adjacent the cylindrical tube, each expansion ring spaced within 50 mm and 450 mm of edge portions of the cast strip formed on opposite end portions of the casting rolls during a casting campaign, the expansion rings adapted to increase in radial dimension causing the cylindrical tube to expand changing roll crown of the casting surfaces of the casting rolls and thickness profile of the cast strip during the casting campaign.

41. The apparatus for continuously casting thin strip by controlling roll crown as claimed in claim 40 further comprising:
e. a control system capable of controlling casting roll drive and varying the speed of rotation of the casting rolls while varying the radial dimension of the expansion ring corresponding to the center of the cast strip and the radial dimension of the expansion rings spaced from the edge portions of the cast strip responsive to electrical signals received from the at least one sensor to control the roll crown of the casting surfaces of the casting rolls during the casting campaign.

42. The apparatus for continuously casting thin strip by controlling roll crown as claimed in claim 40 where the expansion ring corresponding to the center of the cast strip has an annular dimension between 50 and 150 mm and each expansion ring spaced from the edge portions of the cast strip has an annular dimension between 50 and 150 mm.

43. The apparatus for continuously casting thin strip by controlling roll crown as claimed in claim 40 where the expansion ring corresponding to the center of the cast strip provides a heating input of up to 30 kW and each expansion ring spaced from the edge portions of the cast strip provides a heating input of up to 30 kW.

44. The apparatus for continuously casting thin strip by controlling roll crown as claimed in claim 40 where the radial dimension of each expansion ring spaced from the edge portions of the cast strip can be independently controlled to control the roll crown of the casting surfaces of the casting rolls.

45. The apparatus for continuously casting thin strip by controlling roll crown as claimed in claim 40 where the radial dimension of the expansion ring corresponding to the center of the cast strip can be independently controlled to control the roll crown of the casting surfaces of the casting rolls from the radial dimension of each of the expansion rings spaced from the edge portions of the cast strip.

46. The apparatus for continuously casting thin strip by controlling roll crown as claimed in claim 39 further comprising:
  e. a control system capable of controlling casting roll drive and varying the speed of rotation of the casting rolls while varying the radial dimension of the expansion ring responsive to electrical signals received from the at least one sensor to control the roll crown of the casting surfaces of the casting rolls during the casting campaign.

47. The apparatus for continuously casting thin strip by controlling roll crown as claimed in claim 39 where the expansion ring corresponding to the center of the cast strip has an annular dimension between 50 and 50 mm.

48. The apparatus for continuously casting thin strip by controlling roll crown as claimed in claim 39 where the expansion ring corresponding to the center of the cast strip has a width of up to 200 mm.

49. The apparatus for continuously casting thin strip by controlling roll crown as claimed in claim 40 where the expansion ring corresponding to the center of the cast strip has a width of up to 200 mm and each expansion ring spaced from the edge portions of the cast strip has a width of up to 200 mm.

50. The apparatus for continuously casting thin strip by controlling roll crown as claimed in claim 39 where the expansion ring corresponding to the center of the cast strip provides a heating input of up to 30 kW.

* * * * *